Aug. 2, 1927.
F. A. KOLSTER
1,637,615
RADIOCOMPASS
Filed Nov. 22, 1920
2 Sheets-Sheet 1
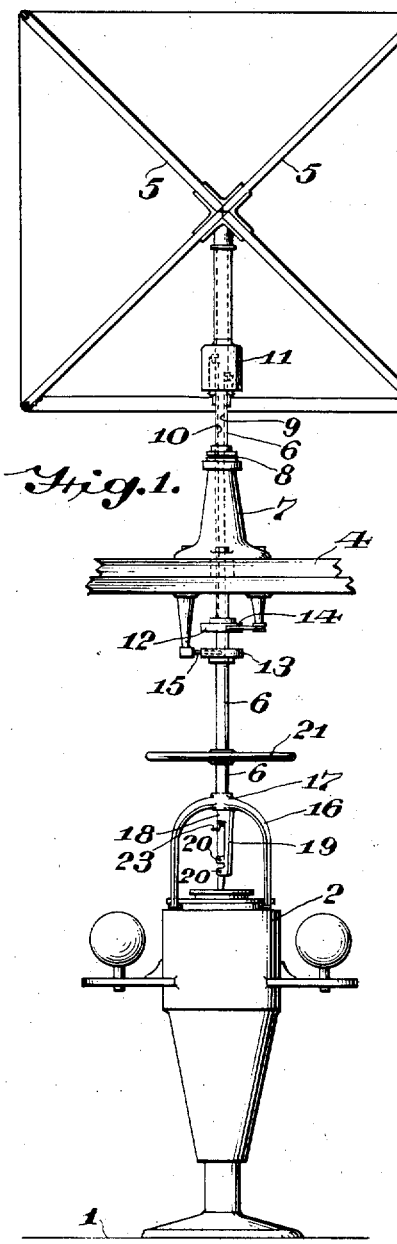
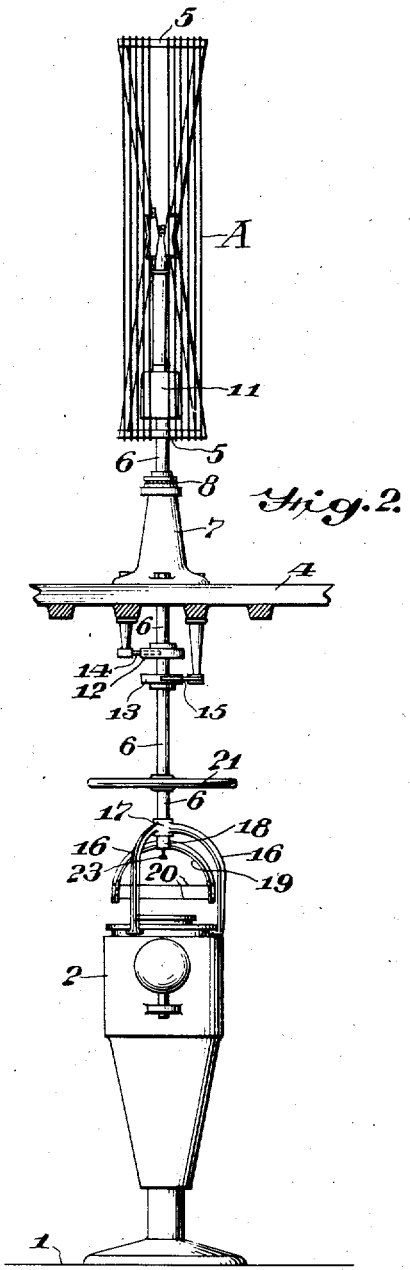
INVENTOR.
Frederick A. Kolster
BY Cornelius L. Ehret
his ATTORNEY.

Aug. 2, 1927.
F. A. KOLSTER
1,637,615
RADIOCOMPASS
Filed Nov. 22, 1920      2 Sheets-Sheet 2
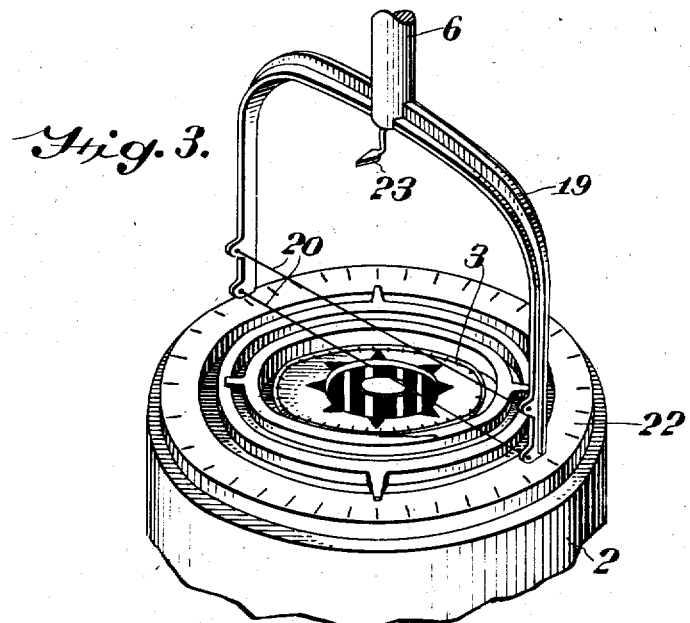
Fig. 3.
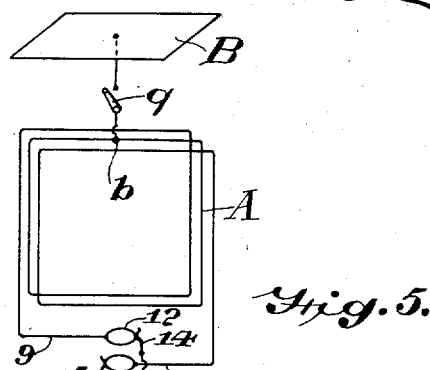
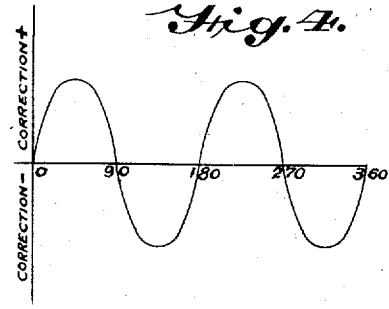
Fig. 4.
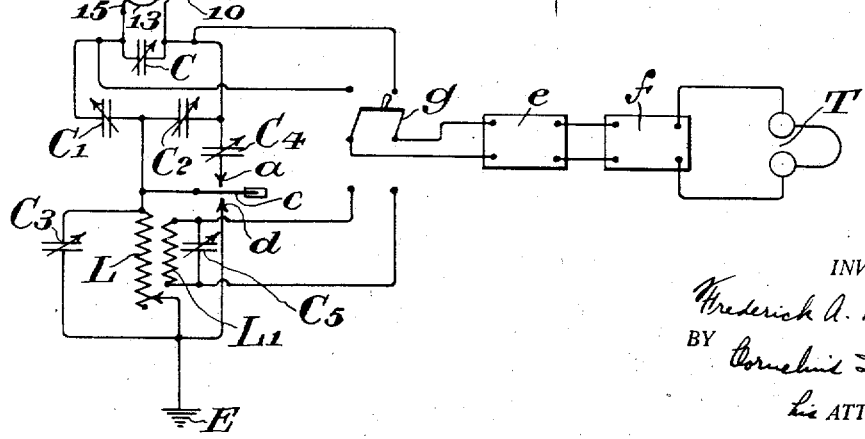
Fig. 5.
INVENTOR.
Frederick A. Kolster
BY Cornelius D. Ehret
his ATTORNEY.

Patented Aug. 2, 1927.

1,637,615

UNITED STATES PATENT OFFICE.

FREDERICK A. KOLSTER, OF WASHINGTON, DISTRICT OF COLUMBIA, ASSIGNOR TO FEDERAL TELEGRAPH COMPANY, OF SAN FRANCISCO, CALIFORNIA, A CORPORATION OF CALIFORNIA.

RADIOCOMPASS.

Application filed November 22, 1920. Serial No. 425,834.

My invention relates to a radio compass for finding the bearing of a source of electro-radiant energy and utilizable either with a ship's compass or in connection with a compass at a shore station.

In accordance with my invention, with a radio compass coil is associated, through suitable structure, a suitable indicator or reading device disposed adjacent a compass, as of the magnetic or gyroscopic type, whereby, particularly on shipboard, the bearing of a source of radiant energy, aboard ship, in the air, or on shore, may be determined.

In accordance with my invention, there is associated with the radio compass a scale whose readings are corrections for distortion of the wave front of the received radiant energy by the mass of the ship or by masses adjacent the compass when located on shore.

My invention resides also in a radio compass circuit arrangement of the character hereinafter described.

For an illustration of one of the various forms my invention may take, reference is to be had to the accompanying drawings, in which:

Fig. 1 is an elevational view of structure embodying my invention.

Fig. 2 is another elevational view of structure shown in Fig. 1.

Fig. 3 is a fragmentary perspective view showing the indicating or scale reading means of the radio compass in association with a compass and correction scale.

Fig. 4 is a correction curve.

Fig. 5 is a diagrammatic view of a radio compass circuit arrangement.

My invention will be described from the standpoint of use upon a ship, though it shall be understood that my apparatus is utilizable in any other suitable arrangement, as at a shore station.

Upon the floor 1 of the ship's pilot house is disposed the binnacle 2 within which is supported upon gimbals, as usual, a magnetic or other compass whose card is indicated in Fig. 3 at 3, the compass card, as usual, swinging to right or left as the ship's course changes.

Above the roof, as 4, of the pilot house is disposed the radio compass coil A of any suitable configuration, dimensions and number of turns. In the example illustrated the coil A is square and axially short, the winding being disposed upon a suitable frame 5 supported upon the upper end of the rotatable vertical shaft 6 extending through the post 7 and roof 4 downwardly adjacent the ship's compass. The shaft 6 may have, as indicated at 8, a ball bearing upon the member 7. Conductors 9 and 10, whose upper ends connect, respectively, with the terminals of the coil A, pass, within a suitable housing 11, downwardly through the shaft 6 and connect, respectively, with the insulated slip rings 12 and 13, upon which bear, respectively, the brushes 14 and 15, the connections of the coil A with the radio compass circuit being made through said brushes as hereinafter described. Upon the binnacle 2 is erected a bracket 16 providing at 17 a bearing for the shaft 6 which, in the example illustrated, is so disposed that its axis coincides with the center of the compass card 3, whereby the vertical axis of rotation of the coil A passes through the center of the card 3.

Secured upon the lower end of the shaft 6 at 18 is the bracket 19 rotatable within the arms of the binnacle bracket 16. Stretched across the lower ends of the arms of the bracket 19 and disposed one vertically above the other are the threads or wires 20, which accordingly sweep around the compass card as the coil A is moved to different positions, as by the hand wheel 21 secured upon the shaft 6 adjacent the compass.

As indicated in Fig. 3, there is disposed upon the upper end of the binnacle 2 the stationary correction scale 22, with which the indicating or reading device 20 co-acts.

The coil A may be utilized in association with any suitable circuit and detecting or indicating means.

When the coil A is employed without an antenna or other means for producing unilateral directional effects, it may be caused to take such position that the response of the indicating device, as a telephone, is a minimum or zero, in which case the plane of the coil A is normal to the line of direction or bearing of the distant source of radiant energy. If the coil is moved to such position that the response in the telephone is a maximum, the plane of the coil coincides with the bearing or line of direction of the distant source of radiant energy.

When the apparatus is employed upon a steel ship or upon a ship having masses capable of distorting the wave front of the received energy, it is found that the wave front is distorted, and such distortion affects the determination of bearing of the source of radiant energy. To correct for such distortion, the ship may, upon installation of the radio compass, sail about within the influence of a source of radiant energy of known bearing to cause the ship's longitudinal axis to point in succession in all directions throughout a complete circumference, and the variation of the bearing as determined by the compass coil from the true bearing may be noted for the different positions of the ship, and from such determinations may be plotted a curve such as shown in Fig. 4. Abscissæ are degrees of horizontal arc or angle, while ordinates are the corrections to be applied to the radio compass coil readings. These corrections may be in terms of degrees of arc. It is found that the correction curve is substantially a sine curve or sinusoidal as indicated. Thus, when the source of radiant energy is in line with the longitudinal axis of the ship, the correction is zero. Thus, in Fig. 4 the value of the correction is zero at the abscissæ marked zero degrees and 180 degrees, 360 degrees being again the same as zero degrees. And when the source of radiant energy is directly abeam, that is, 90 degrees from the longitudinal axis of the ship, the correction is again zero, this being indicated in Fig. 4 at the abscissæ degrees marked "90" and "270."

From the values of the corrections obtained, or as obtained and plotted in Fig. 4, the scale 22 is derived and laid out, it being understood that the center of the compass is preferably in the longitudinal axis of the ship.

Accordingly, in operation the coil A is rotated by hand wheel 21 to such position that the critical response in the telephone is obtained. The wires 20, or equivalent indicating means, are in the line of bearing, or other suitable known angle thereto, as determined by the coil A. Such bearing is then read off on the compass card 3 below, by placing the eye above the wires 20 in such position that the upper wire 20 appears directly above the lower wire 20, and the reading will be found on the compass card 3 directly below these wires. But due to distortion described, this is not the true bearing of the source of radiation. In addition to the compass card reading a reading is similarly taken by the wires 20 or equivalent means upon the scale 22, from which the correction to be applied is read. The reading of the scale 22 is then applied as a correction to the bearing reading found upon the card 3, and the true bearing of the source of radiations then becomes known. The markings or readings of the correction scale 22 may be in different colors; for example, figures in black may be used for positive corrections and figures in red for negative corrections.

In Fig. 5 is shown a circuit arrangement which may be employed, though it will be understood that any other suitable circuit arrangement is contemplated.

To the aforesaid brushes 14 and 15 is connected the variable tuning condenser C in parallel to which are connected in series with each other the variable condensers $C^1$ and $C^2$, which are preferably adjustable or variable in opposite senses, either independently of each other, or by mechanically coupling their movable elements.

The three condensers co-act in tuning the circuit of the coil A to the received energy. From a point between the condensers $C^1$ and $C^2$ is a connection to earth or counter-capacity E through the adjustable inductance L, which may be shunted by the adjustable condenser $C^3$ for tuning the antenna path or earth connection. The antenna path may be supplemented, when suitable or desired, by antenna structure or a capacity area B, which may be brought into operation by closing the switch $q$ connected at $b$ to the middle of coil A. A variable condenser $C^4$, which may be of relatively small capacity, has one terminal connected to one terminal of the condenser $C^2$ and the other to the switch terminal or contact $a$, with which co-acts a switch $c$. A second switch terminal or contact $d$ is connected to the lower terminal of the inductance L. At $e$ is indicated amplifying apparatus, for example, any suitable number of stages of audion or thermionic amplifiers for amplifying the received radio frequency current. The amplified current is delivered to the apparatus $f$ which may comprise a detector, as an audion, and amplifying means of any suitable number of stages, as for example, audion amplifiers for amplifying the audio frequency current, which latter is impressed upon the telephone T. The receiving apparatus may, by throwing the switch $g$ into its upper position, be connected in shunt to the condenser C, and by throwing the switch $g$ to its lower position into shunt with the inductance $L^1$, coupled to the inductance L, and the parallel connected tuning condenser $C^5$. Thus, the receiving apparatus may be associated either with the closed circuit including the coil A, or with the antenna path.

The operation is as follows:

The switch $c$ is thrown into engagement with contact $d$, thereby short circuiting the means for tuning the antenna path. The coil A is then rotated to position for determining the bearing of the distant source of radiation, by bringing its vertical plane into coincidence with or normal to the bearing or direction of the distant source, which is determined, with the switch $g$ in its upper position, when the response in the telephone T is a maximum or a minimum, the closed circuit including the coil A having been tuned by adjustment of the condenser C, to the frequency of the received energy. The capacities of the condensers $C^1$ and $C^2$, for the desired adjustment, are such that the closed circuit including the coil A is electrically symmetrical about the point between the condensers $C^1$ and $C^2$ to which the earth connection is made. Then with the switch $c$ open, and the switch $g$ in its lower position, the antenna path is tuned by suitably adjusting inductance L and condenser $C^3$. Then with the switch $g$ in either its upper or lower position, the switch $c$ is thrown into engagement with the contact $a$, which brings the condenser $C^4$ into parallel with the condenser $C^2$, upsetting the symmetry of the closed circuit including the coil A with respect to the antenna circuit and so causing the receiving apparatus to be affected by energy from both the closed circuit and the antenna path, the magnitude of the capacity $C^4$ determining the degree of unbalancing and therefore the degree or amount of transfer of energy as between the antenna path and closed circuit. With the circuits in this condition the absolute bearing or sense of direction of the distant source becomes known, due to the unilateral action. This absolute sense of direction may be indicated as by a pointer 23, Fig. 3, on the lower end of shaft 6, the plane of the coil A being for such determination of sense of direction coincident with the vertical plane extending from the ship's compass through the distant source of radiation, the pointer 23 accordingly indicating to which side of the coil A the distant source is located. In the example illustrated in Fig. 3, the plane of the coil A is at right angles to the wires 20, though it will be understood that any other angle, as between the plane of the coil A and wires 20 may be employed.

When the switch $g$ is in its upper position, and with the switch $c$ in engagement with the contact $a$, energy is transferred to the receiving apparatus directly from the closed circuit including the coil A and indirectly from the antenna circuit to and through the closed circuit. And when the switch $g$ is used in the lower position, the receiving apparatus is subjected directly to energy received in the antenna path and indirectly to energy transferred from the closed circuit to and through the antenna path to the receiving apparatus.

While means have been indicated for associating the receiving apparatus either directly with the closed circuit or the antenna path, it will be understood that the switching means $g$ may be omitted and the receiving apparatus associated only with the closed circuit including the coil A.

It will be further understood that the structure of the coil A is preferably such that its distributed inductance and distributed capacity are small or substantially nil.

What I claim is:

1. Apparatus for determining the bearing and sense of bearing of a source of electro-radiant energy, comprising a closed circuit having a directional characteristic and including an element rotatable to a position corresponding with the bearing of said source, a plurality of reactances in said circuit, an antenna path connected to a point between said reactances, said reactances being relatively variable to render said closed circuit symmetrical with respect to said antenna path, receiving apparatus subjected to the received energy, and means for rendering said closed circuit unsymmetrical with respect to said antenna path without change of setting of said reactances for determining the sense of bearing of said source comprising a further reactance, and switching mechanism for bringing it into symmetry-disturbing relation with respect to said reactances.

2. Apparatus for determining the bearing and sense of bearing of a source of electro-radiant energy, comprising a closed circuit having a directional characteristic and including an element rotatable to a position corresponding with the bearing of said source, a plurality of reactances in said circuit, an antenna path connected to a point between said reactances, said reactances being relatively variable to render said closed circuit symmetrical with respect to said antenna path, means for tuning said antenna path, receiving apparatus subjected to the received energy, and means for diminishing the effect of said antenna path upon said closed circuit to enhance the directional characteristics of said closed circuit when the latter is substantially symmetrical with respect to the antenna path in taking a bearing of said source, comprising means for detuning said antenna path independently of operation of said tuning means.

3. The method of determining the true bearing of a source of electro-radiant energy whose wave front is distorted, which comprises moving with respect to a bearing scale or compass card an element of an electrical receiving system having a directional characteristic to a position corresponding with the distorted wave front to determine the apparent bearing of the source, and correcting for distortion of the wave front of the electro-radiant energy to determine the true bearing by simultaneously moving with respect to each other the members of a correction device, one of which is representative of the magnitude of the wave front distortion for the then position of the other of said members and of said element of said electrical receiving system with respect to the mass causing the wave front distortion.

4. The method of determining the true bearing of any one of a plurality of sources of electro-radiant energy having different bearings and whose wave fronts are distorted, which comprises moving with respect to a bearing scale or compass card an element of an electrical receiving system having a directional characteristic to a position corresponding with the distorted wave front of the energy from one of said sources to determine the apparent bearing of said one of said sources, and correcting for the distortion of the wave front of the energy received from said one of said sources to determine its true bearing by simultaneously moving with respect to said bearing scale or compass card and to a fixed member of a correction device a second member thereof, one of said members representing the magnitudes of the wave front distortions of the energies from all said sources for all positions of said element of said receiving system with respect to the mass causing the wave front distortion.

5. Apparatus for determining the true bearing of a source of electro-radiant energy whose wave front is distorted, comprising a bearing scale, an electrical receiving system having a directional characteristic and comprising a member movable with respect to said bearing scale to a position corresponding with the distorted wave front to determine the apparent bearing of said source, and a correction device comprising a member fixed with respect to the mass causing the wave front distortion, and a second member movable simultaneously with said movable element of said electrical receiving system with respect to said fixed member, one of said members of said correction device representing the magnitude of the wave front distortion for the position of the apparent-bearing of said movable element of said electrical system with respect to the mass causing the wave front distortion.

6. Apparatus for determining upon a ship the true bearing of a source of electro-radiant energy whose wave front is distorted, comprising a bearing scale or compass card movable with respect to the ship, an electrical receiving system having a directional characteristic and comprising a member movable with respect to said bearing scale or compass card to a position corresponding with the distorted wave front to determine the apparent bearing of said source, and a correction device comprising a member fixed with respect to the ship, and a second member movable with respect to said bearing scale or compass card and to said member simultaneously with said movable element of said electrical receiving system, one of said members of said correction device representing at the position of the other of said members the magnitude of the wave front distortion for the apparent-bearing position of said movable element of said electrical system with respect to the ship.

7. Direction finding apparatus comprising a closed circuit including a rotatable coil, a plurality of capacities in series with each other in said circuit, a connection to counter-capacity or earth from a point between said capacities, means for tuning said connection, a capacity, means for rendering said tuning means inoperative means for bringing said capacity into relation with said capacities for changing the symmetry of said closed circuit with respect to said connection, and receiving apparatus subjected to the received energy.

8. Direction finding apparatus comprising a closed circuit including a rotatable coil, a plurality of capacities in series with each other in said circuit, a connection to counter-capacity or earth from a point between said capacities, means for tuning said connection, means for short circuiting said tuning means, and receiving apparatus subjected to the received energy.

9. Direction finding apparatus comprising a closed circuit including energy absorbing structure having non-uniform directional characteristic, a plurality of reactances in series with each other in said circuit, a connection to counter-capacity from a point between said reactances, a reactance, means for tuning said connection, means for rendering said tuning means inoperative, means for bringing said reactance into relation with said reactances for changing the symmetry of said closed circuit with respect to said connection, and receiving apparatus subjected to the received energy.

10. Direction finding apparatus comprising a closed circuit including energy absorbing structure having non-uniform directional characteristic, a plurality of reactances in series with each other in said circuit, a connection to counter-capacity from a point between said reactances, a reactance, means for tuning said connection, means for rendering said tuning means inoperative, means for bringing said reactance into relation with said reactances for changing the symmetry of said closed circuit with respect to said connection, and receiving apparatus subjected to the energy in said closed circuit.

11. Direction finding apparatus comprising a closed circuit including energy absorbing structure having non-uniform directional characteristic, a plurality of reactances in series with each other in said circuit, a connection to counter-capacity from a point between said reactances, a reactance, switching means for bringing said last named reactance into relation with said reactances for changing the symmetry of said closed circuit with respect to said connection, receiving apparatus subjected to the received energy, and means for bringing said receiving apparatus into operative relation with either said closed circuit or said connection.

12. Direction finding apparatus comprising a closed circuit including energy absorbing structure having non-uniform directional characteristic, a plurality of reactances in series with each other in said circuit, a connection to counter-capacity from a point between said reactances, a reactance, means for tuning said connection, means for rendering said tuning means inoperative, means for bringing said reactance into relation with said reactances for changing the symmetry of said closed circuit with respect to said connection, receiving apparatus subjected to the received energy, and means for bringing said receiving apparatus into operative relation with either said closed circuit or said connection.

13. The combination with a rotatable bearing coil and associated receiving apparatus, of a direction-indicating scale, indicating means co-acting with said scale and disposed in a plane normal to the plane of said coil, means associated with said coil for obtaining a uni-lateral directional characteristic, and means for indicating sense of direction movable with said coil and extending at right angles to said indicating means.

14. The combination with a closed circuit, of a plurality of reactances in series with each other in said circuit, an antenna path connected to a point between said reactances, at least one of said reactances being variable to render said closed circuit symmetrical with respect to said point of connection, means for tuning said antenna path, a third reactance, and switching mechanism in one position rendering said third reactance effective to unbalance said closed circuit with respect to said antenna path and in another position rendering said tuning means inoperative, and receiving apparatus subjected to the received energy.

15. The method of determining the bearing of a source of electro-radiant energy whose wave front is distorted, which comprises moving an element of an electrical receiving system having a directional characteristic to a position corresponding with the apparent bearing of said source, simultaneously moving with respect to a member fixed with respect to a mass causing wave front distortion a second member related to said movable element of said electrical receiving system, and effecting correction for wave front distortion to an extent determined by the relative position of said fixed and movable members.

16. The combination with a radio receiving system having a directional characteristic and including an element movable to position corresponding with the apparent bearing of a source of electro-radiant energy, of a member fixed with respect to a mass causing wave front distortion, and a second member moved with respect to said fixed member in response to movement of said element of said receiving system to determine simultaneously with the settings of said movable element the magnitudes of corrections for wave front distortion for different positions of said movable element.

17. A directional radio system comprising an element rotatable to a position corresponding with the direction of propagation of electro-radiant energy, a member fixed with respect to a mass causing wave front distortion, and a second member moved with respect to said fixed member in response to rotation of said element, the positions of said fixed and movable members with respect to each other determining the magnitudes of corrections for wave front distortion for the different positions of said rotatable element.

In testimony whereof I have hereunto affixed my signature this 22nd day of November, 1920.

FREDERICK A. KOLSTER.